United States Patent Office 3,359,068
Patented Dec. 19, 1967

3,359,068
PREPARATION OF CRYSTALLINE
ZEOLITE PARTICLES
Edward Michalko, Chicago, Ill., assignor to Universal Oil Products Company, Des Plaines, Ill., a corporation of Delaware
No Drawing. Filed Apr. 13, 1964, Ser. No. 359,414
5 Claims. (Cl. 23—112)

This invention relates to a novel method of producing synthetic zeolites which upon dehydration yield an adsorbent of controlled pore diameter commonly known as a "molecular sieve." More specifically, this invention relates to a method for producing the solid molecular sieve in an attrition-resistant aggregate form of desired shape as opposed to prior art methods of producing pulverulent masses. Still more specifically, this invention relates to a method of producing a molecular sieve without the use of a binder to hold the zeolite crystals together. Further, this invention relates to a method of producing zeolites of any desired size or shape without the use of a clay type binder.

This invention also relates to a novel synthetic zeolite having enhanced molecular sieve properties. This invention still further relates to synthetic zeolites of desired shape having enhanced molecular sieve properties. More specifically, this invention relates to synthetic zeolites of substantially spherical shape in any desired size having enhanced molecular sieve properties.

In one of its embodiments this invention relates to a method of preparing a synthetic zeolite particle having a predetermined size and shape which comprises preparing a solid refractory inorganic oxide particle of said size and shape comprising an oxide selected from the group consisting of silica and alumina, bringing said particle into contact with an aqueous treating solution containing alkali metal cations and anions selected from the group consisting of hydroxyl, silicate and aluminate, the composition of said treating solution being established in relation to the original composition of said particle to incorporate both silica and alumina in the finished zeolite in the desired amounts, maintaining said particle in contact with said treating solution until it is substantially converted to a zeolite particle of approximately said size and shape and separating the zeolite particle from the treating solution.

In another of its embodiments this invention relates to a method of preparing a synthetic zeolite particle of predetermined size and shape by reacting a silica-alumina particle of said predetermined size and shape with a treating solution containing alkali metal cations and anions selected from the group consisting of hydroxyl, silicate and aluminate to form a zeolite particle of substantially said predetermined size and shape. In another of its embodiments this invention relates to a method of preparing a synthetic zeolite particle of predetermined size and shape by reacting an alumina particle of said predetermined size and shape with a treating solution containing alkali metal cations and anions selected from the group consisting of hydroxyl, silicate and aluminate to form a zeolite particle of substantially said predetermined size and shape. In still another of its embodiments this invention relates to a method of preparing a synthetic zeolite particle of predetermined size and shape by reacting a silica particle of predetermined size and shape with a treating solution containing alkali metal cations and anions selected from the group consisting of hydroxyl, silicate and aluminate to form a zeolite particle of substantially said predetermined size and shape.

In a still more specific embodiment this invention relates to the production of synthetic zeolites having a size range of commercial fluid catalytic cracking catalyst which comprises contacting fluid catalytic cracking catalyst predominantly composed of silica and alumina with an aqueous treating solution containing alkali metal cations and anions selected from the group consisting of hydroxyl, silicate and aluminate, the composition of said treating solution being established in relation to the original composition of said fluid cracking catalyst to incorporate both silica and alumina in the finished zeolite in the desired amounts, maintaining said fluid catalyst in contact with said treating solution until it is substantially converted to zeolite particles and then separating the zeolite particles having substantially the same size range as said fluid cracking catalyst.

In another of its embodiments this invention relates to synthetic zeolites having high rates of adsorption and high adsorptive capacities. In a more specific embodiment this invention relates to binderless, substantially spherically shaped zeolites of any desired size having high rates of sorbing selectively sorbed components from fluid mixtures.

Molecular sieves have become increasingly important in the field of adsorbents in the past few years. The sieves are of crystalline structure having many small cavities connected by still smaller pores of uniform size. These pores may vary in size from 3 Angstrom units up to 12 or 15 or even more Angstrom units. However, a particular molecular sieve material desirably will have a uniform pore size. These crystalline aluminosilicate materials are chemically similar to clays and feldspars and belong in the class of materials called zeolites. Zeolites vary somewhat in composition although they generally contain aluminum, silicon, oxygen and an alkali and/or alkaline earth metal. The zeolites may be dehydrated without destruction of the crystal structure, leaving an interlaced crystal structure of regularly spaced channels.

There are a number of commercially available molecular sieves, each having a particular pore size. It is within the scope of this invention to produce all of these various types such as, for example, Type A, Type X, etc., by the method herein disclosed. Molecular sieves are useful in many applications such as the drying of various materials and separating hydrocarbon molecules either by polarity or by molecular size selectivity. In this latter mentioned application the molecular sieves having pore sizes of 5 Angstrom units can separate straight chain aliphatic hydrocarbons from hydrocarbon mixtures by selective adsorption of the straight chain molecules thus upgrading the octane number of the non-selectively sorbed fraction of the hydrocarbon mixture.

The method herein described may be used to produce alkaline earth metal zeolites by one additional step, namely, the replacement of alkali metal ions with alkaline earth metal ions after the alkali metal zeolite has been produced. This can be accomplished by well-known methods of ion exchange as, for example, soaking the alkali metal zeolite particles in a finishing solution containing the desired alkaline earth metal ions. Thus, for example, the method of this invention can produce 3 A., 4 A. or 5 A. (where A. represents Angstrom units) molecular sieves of a predetermined size and shape by contacting silica alumina particles of said predetermined size and shape having a 50/50 weight ratio of $SiO_2/Al_2O_3$ with an aqueous solution of sodium hydroxide, maintaining the two materials in contact until the particles have been substantially converted to a zeolite structure and separating the solid particles having a 4 A. pore size. The particles may then be ion exchanged with a solution containing potassium ions to produce a 3 A. zeolite or the particles may be ion exchanged with a solution containing calcium ions to produce a 5 A. zeolite. In all three cases a Type A zeolite of a desired size and shape may be produced without the use of a binder material in 3 A., 4 A. or 5 A. pore sizes.

Mineral sorbents are widely used both in fluid bed and in fixed bed processes in which the sorbent is desired in the form of coarse particles rather than powdered masses. In fixed bed processes, sorbents of from 8 mesh to 70 mesh in size are preferable whereas in fluid processes sorbents of from 100 to 200 or even 350 mesh in size are preferable. Some gas treating beds of sorbents employ very coarse size particles in the 4 to 10 mesh size range. The use of particles in substantially spherical or spheroidal shape offers numerous advantages, particularly when the particle is used as an adsorbent, treating, refining or purifying agent or as a catalyst or component of a catalyst for the conversion of organic compounds and still more particularly for the conversion or separation of hydrocarbons. When used as a fixed bed of packing material in a reaction or adsorption contacting zone, the spheroidal shaped particles permit more uniform packing and thereby reduce variations in pressure drop through the bed and accordingly reduce channeling which otherwise results in a portion of the bed being bypassed. Another advantage in the use of particles of spheroidal shape is that the spheres contain no sharp edges to break or wear off during processing or handling and therefore reduce the tendency to plug the process equipment. These advantages are magnified when the particles are used as a moving or fluid bed, that is, when the particles are transported from one zone to another by either the reactants or by an extraneous carrying medium. It is thus seen that the use of particles in this shape permits a more effective utilization of these particles.

Present methods of producing synthetic zeolites are not satisfactory in either producing particles of desired coarseness or size or of desired shape. Prior art methods typically produce synthetic zeolites in a finely divided powdered form ranging in size from 0.5 to 5 microns. In order to obtain the zeolites in a useful size, the powdered zeolite is agglomerated with a binder such as clay to produce particles of desired size. These particles are typically produced in pellets or beads of non-uniform size or shape through methods such as extrusion. In order that the particles be of sufficient hardness, binders up to 20 or more weight percent of the total particle are employed. This results in a heterogeneous mixture of zeolite and binder in which the binder contributes nothing to the zeolite particle as a sorbent but instead occupies valuable space in the particle. Probably the binder results in poorer zeolite particles as the binder may tend to plug some of the pores and otherwise interfere with the sorbent activity. The method of this invention can produce synthetic zeolites of any desired size and shape without the use of binders. Another disadvantage of producing zeolite crystals in the 0.5 to 5 micron size range is the difficulty in handling these crystals before the binder is added such as separating the fine crystals from the reaction medium.

It is an object of this invention to produce zeolites which have the above mentioned desirable size and shape while obviating the above mentioned difficulties. It is another object of this invention to produce synthetic zeolites directly in the form of useful aggregate size and of desired shape as contrasted with prior art powdered form. Still another object of this invention is a method of producing hard coherent zeolite particles of desired size and shape without the use of extraneous binding material.

Still another object of the present invention is a method for the production of substantially pure homogeneous zeolites directly in the form of binderless particles of desired size and shape which are attrition resistant and give uniform packing. Another object of this invention is the production of substantially spherical shaped zeolites of any desired size. It is a further object of this invention to produce a zeolite which has enhanced molecular sieve properties by control of suitable size, shape, composition and surface area to result in a zeolite having a greater rate of sorption and desorption and a greater adsorptive capacity. It is a further object of this invention to produce a zeolite which has a greater hydrocarbon adsorption rate than those available in the prior art. It is another further object of this invention to produce a zeolite which has a greater hydrocarbon adsorption capacity than those available in the prior art. A still further object of this invention is a method for producing zeolites which have greater hydrocarbon adsorption rates and capacities. Another specific object of this invention is an improved zeolite catalyst support useful in catalyzing selective reactions. These and further objects and advantages, which will become apparent to one skilled in the art, are within the scope of this invention.

One of the starting materials in the process of this invention are solid particles of desired size and shape composed of silica, alumina or mixtures in any proportion of silica and alumina. Methods for producing any of these three alternative starting materials are well known in the prior art. For example, commercial fluid catalytic cracking catalyst particles have been produced for many years in the 100 to 300 mesh size range containing silica-alumina mixtures in several ratios. This commercially available fluid cracking catalyst may be converted into zeolites by employing the process of this invention.

Methods of producing alumina, silica and silica-alumina particles have long been known in the prior art. For example, United States Patent No. 2,270,090 shows a method for manufacturing silica-alumina particles. Likewise, United States Patents Nos. 2,285,314, 2,285,396, 2,382,951 and 2,526,907 all disclose methods or improvements in the manufacture of silica-alumina particles. These particles have long been recognized as having the ability to crack hydrocarbon molecules and many attempts have been made to produce catalytically active particles for use in a reaction zone. United States Patents Nos. 2,462,236, 2,733,220, 2,645,619 and 2,672,453 disclose methods and/or improvements in the manufacture of silica particles. United States Patents Nos. 2,620,314, 2,703,315 and 2,865,866 disclose methods and improvements in the manufacture of alumina particles. Also the manufacturing of the above mentioned particles in certain sizes and shapes is well known in the prior art. For example, United States Patents Nos. 2,442,884 and 2,733,220 disclose methods and/or improvements in the manufacture of inorganic oxides in spherical form. It is apparent that silica particles, alumina particles and silica-alumina particles can be produced in all sizes and shapes in view of the extensive knowledge of their production in the prior art. There is little point in describing in great detail their preparation since these three kinds of particles are readily available in the commercial market and the preparation thereof forms no part of this invention. Any of the three particles can be obtained in the desired size and shape without difficulty.

Typically silica particles may be produced in the following manner. Water glass or silica frits are commercially available and are diluted in water to give concentrations in the order of 16% $SiO_2$. This solution is added to an acid such as HCl or $H_2SO_4$ to give a solution having a pH less than 4. Hexamethylenetetramine is added to the silica sol and the resulting mixture may be dropped into a forming oil at a temperature less than 100° C. in discrete particles resulting in hydrogel particles. Various dropping techniques are known to produce hydrogel spheres of desired size. The hydrogel particles are aged typically at temperatures in the range of 90° C. to 150° C. in the forming oil, then water washed to remove salts, dried at temperatures in the range of 150° C. to 250° C. and finally calcined at temperatures in the range of from 350° C. to 700° C. The resultant silica particles are then ready to be contacted with the aqueous treating solution described herein. Said resulting mixture may also be precipitated to form a hydrogel and extruded into pellet type particles of a given size. The resulting pellets may then be dried and calcined as described above.

Typically, silica-alumina particles may be produced in the following manner. A silica sol is prepared as described above. An alumina sol is prepared by digesting substantially pure aluminum pellets in HCl at conditions such that the aluminum to chloride weight ratio is substantially in the range of 1.0 to 1.4. The silica sol and the alumina sol are mixed together in such proportions as to give the ultimate desired $SiO_2/Al_2O_3$ ratio, urea and hexamethylenetetramine are added and the resultant mixture dropped into a forming oil at temperatures less than 100° C. in discrete particles resulting in hydrogel particles. Again the size and shape of the hydrogel particles may be controlled by well-known methods. The aging, washing, drying and calcining steps as described above are repeated to form the desired silica-alumina particles. The resulting silica-alumina particles are then ready to be contacted with the aqueous treating solution described herein. The silica-alumina particles may also be extruded into pellets, dried and calcined as described above.

Typically, alumina particles may be produced in the following manner. An alumina sol is prepared as described above. Hexamethylenetetramine and urea are added to the alumina sol as sources of ammonia for gelation and subsequent neutralization of the sol. This resultant mixture is dropped into a forming oil at temperatures less than 100° C. in discrete particles resulting in hydrogel particles. The size and shape of the hydrogel particles may be controlled by well-known methods. The aging, washing, drying and calcining steps as described above are repeated to form the desired alumina particles. The resulting alumina particles are then ready to be contacted with the aqueous treating solution described herein. The alumina particles may also be extruded into pellets, dried and calcined as described above.

In all three cases it is preferable to first calcine the particles before contacting them with the aqueous treating solution. The calcination step is important in determining the strength and density of the finished zeolite particles. The dried but uncalcined particles may also be converted to zeolites but generally these resulting zeolite particles have less strength and are more easily crushed than those zeolites formed from calcined particles. The washed but undried and uncalcined particles tend to disintegrate upon contact with the aqueous treating solution thus destroying the desired size and shape of the particles. Therefore, this latter method is less satisfactory. In general, it is preferable to calcine the particles at temperatures of 350 to 700° C. in the presence of air for a period of time sufficient to obtain particles of desired strength and density. The calcined particles are then contacted with the treating solution as described herein.

Dropping techniques are well known to produce spheroidal shaped particles which, when finished, will have nominal diameters in the range of from 1/64 to 1/4 of an inch. Spray drying techniques are also well known to produce particles in the size range of 50 to 350 mesh. Such latter methods are commonly employed in the commercial manufacture of fluid catalytic cracking catalyst.

The essence of this invention involves the step of contacting one of these three types of refractory oxide particles with an aqueous treating solution containing alkali metal cations and anions selected from the group consisting of hydroxyl, silicate and aluminate, the composition of said treating solution being established in relation to the original composition of said particles to incorporate both silica and alumina in the finished zeolite in the desired amounts. It has been found that when one of the above mentioned three calcined particles having a definite size and shape has been reacted with the treating solution, a molecular rearrangement and reaction occurs within the particle thus forming a zeolite structure having substantially said definite size and shape. Therefore, the size and shape of the produced zeolite is substantially the size and shape of the starting particle. The contacting step should be carried out at temperatures of from 25° C. to 150° C. and preferably 50° C. to 120° C. Generally, the higher the temperature, the shorter is the required contacting time. The contacting times vary from a few minutes to several days although preferable times vary from 2 or 4 hours up to 24 hours. For example, pure silica spheres whose diameter was substantially 1/16 of an inch were completely converted to a molecular sieve by contact with an aqueous solution of $NaAlO_2$ in less than 18 hours at 100° C. It is desirable that the treating solution have a high pH, greater than 11 and preferably greater than about 12, in order to effectively rearrange the molecular structure into the zeolite crystal.

One factor in the determination of the zeolite type is the silica to alumina ratio. Thus, in the formation of a given type zeolite, the starting particle and the treating solution must give to the finished zeolite a molecular ratio of silica to alumina to result in said given type. This means that the concentration of silicate and/or aluminate ions in the treating solution is adjusted, in relation to the concentration of silica and/or alumina in the starting particle, to provide the proper silica to alumina ratio in the finished zeolite. A convenient method of accomplishing this is to contact a silica-alumina particle having approximately the desired molecular ratio of silica to alumina with an aqueous treating solution comprising sodium hydroxide. The silica to alumina ratio may be changed to give any desired type of zeolite such as Type X, Type A, etc.

It is within the scope of the invention that the cations of the treating solution comprise sodium, potassium or lithium. In order to form 4 A. zeolites, sodium cations would be used. Therefore, to make 4 A. zeolites, the aqueous treating solution would comprise compounds selected from the group consisting of sodium silicate, sodium aluminate and sodium hydroxide. Likewise, the potassium or even the lithium cations could be used. These alkali metal cations are suitable to achieve the desired high pH of the treating solution.

The anions of the treating solution are selected from the group consisting of hydroxyl, silicate and aluminate. The composition of the anions of the treating solution are established in relation to the original composition of the solid particles to incorporate silica and alumina in the finished zeolite in the desired amounts. For example, it may be desired to have a finished zeolite having a molecular ratio of silica/alumina of 1.85/1.0. This can be accomplished by any of the following four methods: (1) Obtain silica-alumina particles having said 1.85/1.0 ratio already present and use sodium hydroxide as the active component of the treating solution; (2) Obtain silica particles and use sufficient sodium aluminate and excess sodium hydroxide as the active component of the treating solution to achieve the desired 1.85/1.0 ratio; (3) Obtain alumina particles and use sufficient sodium silicate and excess sodium hydroxide as the active component of the treating solution to achieve the desired 1.85/1.0 ratio; (4) Obtain silica-alumina particles not having the desired 1.85/1.0 molecular ratio and use a treating solution containing sodium cations, hydroxyl anions and aluminate and/or silicate anions present in such concentration that upon reaction the finished zeolite has said 1.85/1.0 molecular ratio of silica/alumina.

In a batch preparation method, after the particles have been converted to zeolites they may be separated from the spent treating solution by decanting off the spent solution or by using any other well-known method of separating a solid phase from a liquid phase. It is possible to convert the solid particles to zeolites in a continuous process wherein the solid refractory oxide particles and fresh treating solution are continuously introduced into a contactor while spent treating solution and zeolites are continuously withdrawn from said contactor. It is also possible to have a semi-continuous process such as that in which the treating solution is circulated from one tank to another, each tank containing solid particles at various stages of conversion to zeolite. These and other well-known methods of contacting the treating solution with the solid particles will be apparent to one skilled in the art. It is also possible to use elevated pressure during the containing step in order to accelerate the conversion of the refractory oxide particles to zeolite particles.

Recently, the incorporation of a metal catalyst within the porous structure of a molecular sieve has been disclosed. The zeolites produced from the method of this invention are a preferable carrier for the metal catalyst because of their size, shape and uniformiyt. Spherically shaped catalyst particles are preferable since reactants that pass over a fixed bed of catalyst will pass over a more uniformly packed bed, thereby reducing channeling and allowing more efficient contact between said reactants and the catalyst. Furthermore, the uniformity, the surface area and the density of the catalyst particles are more easily controlled. As an example, spherical zeolites may be prepared as described herein and an active catalytic ingredient impregnated on the finished zeolite. Specifically, a solution containing the active metal cation such as platinum (in the form of chloroplatinic acid) is contacted with 5 A. zeolites, the excess liquid driven off and the particles thereupon oxidized to form the desired platinum impregnated zeolite. These catalysts have the unique feature of causing reactions to occur on selective components of a mixture of possible reactants. For example, 5 A. molecular sieves will allow the passage of normal hydrocarbon molecules into the porous structure while preventing cyclic and isomerized hydrocarbons from entering the pores. Therefore, such a catalyst will cause selective reactions to occur on the normal hydrocarbon molecules since only these molecules can reach the active catalytic sites.

Normal paraffinic hydrocarbons are undesirable in gasoline stocks due to their low octane number, and their selective conversion to higher octane molecules can be accomplished by such zeolite support catalysts. It is possible to impregnate an acid function catalytic ingredient inside of the pores of a zeolite. Upon contacting a gasoline boiling range hydrocarbon mixture along with hydrogen under conditions of reforming (i.e., pressures in the order of 200 to 500 p.s.i.g. and temperatures in the order of 900 to 1000° F.) with an acid function catalyst, the undesirable normal paraffinic hydrocarbon molecules will enter the porous structure and crack into smaller hydrocarbon paraffins of higher octane number. Therefore, a selective reaction resulting in the removal of an undesirable component of a hydrocarbon mixture is accomplished by a catalytic zeolite. Since zeolites produced by the method of this invention have greater rates of adsorption than prior art methods, said zeolites are preferable catalytic supports.

Another useful application of the method of this invention is the conversion of ultra-fine (less than 30 micron particle size) fluid catalytic cracking catalyst into useful zeolites. In the manufacture of commercial fluid catalytic cracking catalyst, spray drying techniques are employed to form the catalyst particles. It is generally desired that these particles have sizes greater than 30 microns in order that commercial cyclones may separate these catalyst particles from effluent streams and return said catalyst to the reaction zone. Cyclones become less effective in separating particles as the size of the particles decreases. Generally, cyclones are not satisfactory in separating particles having less than 30 microns in size. Unfortunately, in said spray drying techniques a small percentage of the catalyst particles are formed in sizes less than 30 microns. These particles may be converted to zeolites by the method of this invention and made into useful size zeolite particles using clay type binders. As shown in Example V, these zeolites have greater rates of adsorption and higher adsorptive capacities than existing commercially prepared zeolites.

The following examples are introduced for the purpose of further illustrating the novelty and utility of the present invention but not with the intention of limiting the same.

EXAMPLE I

Silica-alumina hydrogel spheres, prepared by cogelation of a silica hydrosol and an alumina sol in a 50/50 weight ratio of $SiO_2/Al_2O_3$ were pressure aged for 1.5 hours at 120° C. in a forming oil. The hydrogel spheres were then washed free of salts, dried at 125° C. and a portion of the spheres were then calcined for 3 hours at 650° C.

73 grams of the calcined spheres of $\frac{1}{16}$ inch diameter were then treated by contact with an aqueous solution containing 44 grams of sodium hydroxide and 250 cc. of water for a period of 20 hours at 100° C. The spheres were then separated from the aqueous solution and were analyzed and identified as being zeolite by laboratory analysis.

The dried but uncalcined spheres were also contacted with an aqueous solution of sodium hydroxide in a 1.5 $Na_2O/Al_2O_3$ mole ratio for a period of 20 hours at 100° C. The spheres were then separated from the aqueous solution and were analyzed and identified as being a zeolite by laboratory analysis.

The zeolite produced from the calcined spheres produces a sturdy $\frac{1}{16}$ inch diameter, 4 Angstrom pore size spherical particle in excellent yield. The zeolite produced from the dried but uncalcined spheres produced $\frac{1}{16}$ inch diameter spherical particles of low strength which could be crushed by the application of pressure of a man's finger. The former zeolite was contacted with an aqueous finishing solution containing 10% calcium chloride at 25° C. for 15 minutes. This procedure was repeated again with a fresh second finishing solution. The finished zeolite which was 62% ion exchanged was separated from the second finishing solution and comprised sturdy 5 Angstrom pore size, $\frac{1}{16}$ inch spherical molecular sieve particles.

EXAMPLE II

Silica hydrogel spheres, prepared by dropping a silica sol into forming oil, were aged in forming oil at 120° C., water washed to remove neutralization salts, dried at 125° C. and calcined at 650° C. 50 grams of the $\frac{1}{16}$ inch silica spheres were then contacted with an aqueous solution containing 82 grams of sodium aluminate ($NaAlO_2$) and 300 cc. of water for 18 hours at 100° C. The resulting $\frac{1}{16}$ inch zeolite spheres comprise a 4 Angstrom molecular sieve.

These 4 Angstrom molecular sieve spheres were ion exchanged with aqueous finishing solutions of calcium chloride as described in Example I. The finished zeolite was separated from the second finishing solution and comprised sturdy 5 Angstrom, $\frac{1}{16}$ inch substantially spherical molecular sieve particles. This product was identified as being a zeolite by laboratory analysis.

EXAMPLE III 105 grams of commercially produced ultra fine (less than 20 micron particle size) fluid catalytic cracking catalyst having a silica to alumina weight ratio of 86/14 was contacted with an aqueous treating solution containing 7.3 percent sodium aluminate and sodium hydroxide such that the overall $SiO_2/Al_2O_3$ weight ratio was 50/50. Contact was maintained for 24 hours at 95° C. and resulted in 4 Angstrom pore size zeolite particles in the same particle size range as said cracking catalyst. The zeolite particles were then ion exchanged with an aqueous calcium chloride solution to produce 5 Angstrom molecular sieve particles.

The 5 Angstrom molecular sieve particle was combined with 20% clay binder and extruded to 14–40 mesh particles.

EXAMPLE IV

Silica hydrogel spheres were prepared in 1/32 inch size. One hundred grams of the 1/32 inch calcined silica spheres were contacted with an aqueous solution containing 166 grams of sodium aluminate and 500 cc. of water for 6 hours at 93° C. The resulting 1/32 inch zeolite spheres comprised a molecular sieve.

The 4 Angstrom molecular sieve spheres were ion exchanged with aqueous finishing solutions of calcium chloride as described in Example I. The finished zeolite was separated from the second finishing solution and comprised sturdy 5 Angstrom 1/32 inch substantially spherical molecular sieve particles. This product was identified as being a zeolite by laboratory analysis.

EXAMPLE V

The zeolites that have been produced by my disclosed method have enhanced properties over those commercially available. Two commercially available 5 Angstrom "A Type" zeolite particles, one having a clay binder and one described by the manufacturer as being "binderless," were compared with the 1/16 inch 5 Angstrom sphere prepared in Example I and with the 20% clay bindered 5 Angstrom zeolite prepared in Example III as to rates of adsorption and as to ultimate adsorption capacity. The zeolites will hereinafter be referred to as commercial bindered, commercial binderless, Example I and Example III respectively.

Twenty grams of commercial bindered zeolite having a particle size range of 30–50 mesh were loaded into a vessel and purged with nitrogen until the pores of the zeolite contained substantially all nitrogen. Fifty cc. of 2,2,4-trimethylpentane was added to the vessel completely covering the zeolite and displacing the nitrogen from the void spaces between the zeolite particles. After complete displacement of the nitrogen, 5 cc. of technical grade normal hexane was added to the vessel. The trimethylpentane molecules are too large to pass into the pore structure but when the straight chain hexane is added to the vessel, the latter compound can pass into the pore structure of the zeolite particles and displace nitrogen from the pores. The displaced nitrogen can be collected and measured. The rate of displacement of nitrogen is a measure of the rate of activity of the molecular sieve while the totally evolved nitrogen is a measure of the ultimate hydrocarbon capacity. Both of these properties are important in determining whether a molecular sieve is a satisfactory sorbent in an adsorption process. Two and one-half minutes after adding the normal hexane to the vessel, 910 cc. of nitrogen per 100 grams of zeolite at standard conditions were evolved. After allowing the mixture in the vessel to stand for 2 hours thus coming to equilibrium, 1485 cc. of nitrogen per 100 grams of zeolite were evolved.

This nitrogen evolution method was repeated for 20 grams of 30–50 mesh commercial binderless zeolite and resulted in 500 cc. per 100 grams of nitrogen being evolved after two and one-half minutes. After allowing the mixture to come to equilibrium, 1583 cc. per 100 grams of nitrogen were evolved.

The nitrogen evolution method was repeated for 20 grams of Example I 1/16 inch spherical zeolite and resulted in 979 cc. per 100 grams of nitrogen being evolved after two and one-half minutes. After allowing the mixture to come to equilibrium, 1971 cc. per 100 grams of nitrogen were evolved.

The nitrogen evolution method was repeated for the Example III 14–40 mesh 20% clay binded zeolite and resulted in 1346 cc. per 100 grams of nitrogen being evolved after two and one-half minutes. After allowing the mixture to come to equilibrium, 1728 cc. per 100 grams of nitrogen were evolved. The results of these four experiments are tabulated in Table I below.

TABLE I

| Sample | Rate of $N_2$ evolution after 2½ minutes, cc./100 gr. | Total $N_2$ evolution after equilibrium, cc./100 gr. |
| --- | --- | --- |
| "Type A" Commercial Bindered | 910 | 1,485 |
| "Type A" Commercial Binderless | 500 | 1,583 |
| Example I Binderless 1/16" Spheres | 979 | 1,971 |
| Example III Bindered Particles | 1,346 | 1,728 |

It is apparent that zeolites produced by the method of this invention have both greater rates of adsorption and higher ultimate adsorption capacities. In both the Example I zeolite spheres and the Example III zeolite particles, these zeolites have enhanced properties over zeolites produced by prior art methods. Although the mechanism of the enhanced properties of my zeolites is not precisely understood, nevertheless, the significant differences in rates of adsorption and adsorption capacity establish that a new composition of matter has been created.

I claim as my invention:

1. A method for preparing a synthetic crystalline zeolite particle of substantially spherical shape which comprises:
   preparing a silica sol;
   dropping said sol through a bath of forming oil to form a spherical silica particle;
   calcining said particle by heating at an elevated temperature;
   bringing the resulting calcined spherical particle into contact with an aqueous treating solution containing alkali metal aluminate and having a pH greater than about 11;
   reacting said particle with said treating solution while substantially preserving its sphericity until it is substantially converted to a crystalline zeolite of approximately said spherical shape;
   and separating the zeolite particle from the treating solution.

2. The method according to claim 1 further characterized in that the contacting of the particle with the aqueous treating solution is carried out at a temperature within the range of 25° C. to 150° C.

3. The method according to claim 1 further characterized in that the contacting of the particle with the aqueous treating solution is carried out at a temperature within the range of 50° C. to 120° C.

4. The method according to claim 1 further characterized in that after the zeolite particle has been formed at least a portion of the alkali metal cations thereof are ion exchanged with alkaline earth metal cations to change the effective pore size of said zeolite particle.

5. The method according to claim 1 wherein said alkali metal aluminate is sodium aluminate.

References Cited

UNITED STATES PATENTS

| | | | |
| --- | --- | --- | --- |
| 2,733,220 | 1/1956 | Wankat | 252—448 |
| 2,973,327 | 2/1961 | Mitchell et al. | 252—449 |
| 2,983,670 | 5/1961 | Seubold | 252—455 X |
| 3,065,054 | 11/1962 | Haden et al. | 23—112 |
| 3,119,660 | 1/1964 | Howell et al. | 23—112 |
| 3,140,322 | 7/1964 | Frilette et al. | 252—455 |
| 3,185,544 | 5/1965 | Maher | 23—112 |
| 3,244,643 | 4/1966 | Schwartz | 252—455 |

OSCAR R. VERTIZ, *Primary Examiner.*

EDWARD J. MEROS, *Examiner.*